Sept. 18, 1951  I. BEILEY ET AL  2,568,110
METHOD OF MAKING GLASSY PHOSPHATE
DETERGENT COMPOSITIONS
Filed Oct. 28, 1946
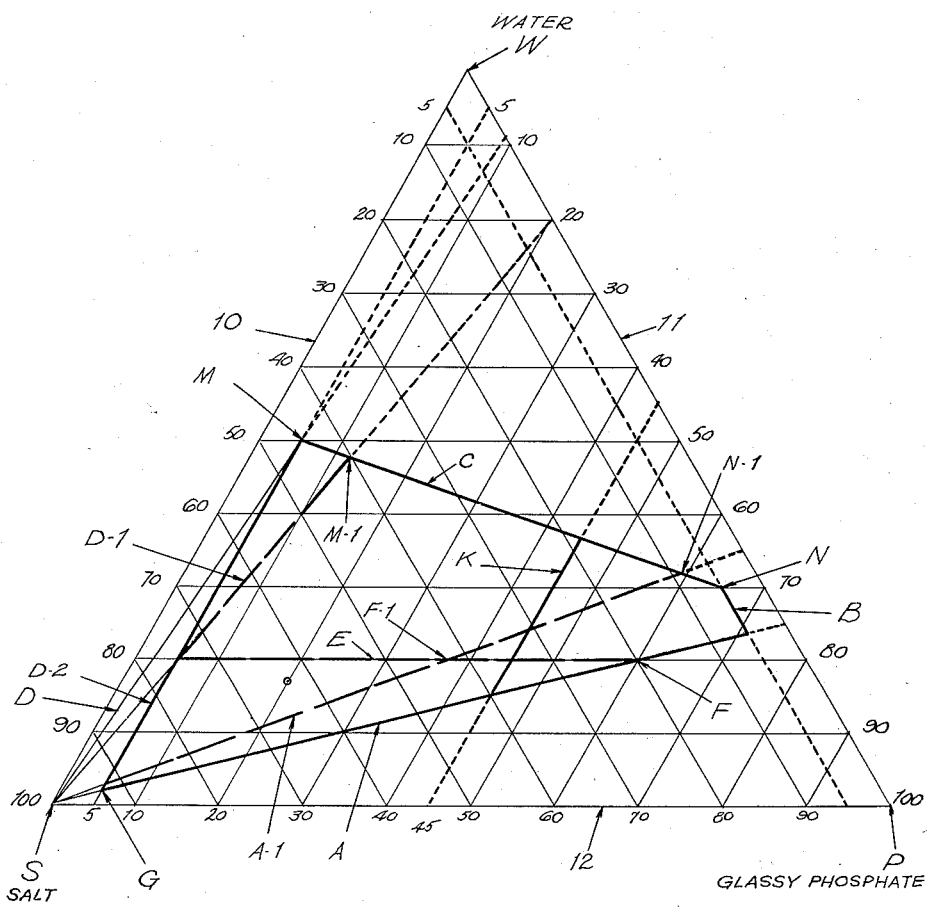
INVENTORS
IRVING BEILEY
ARTHUR H. RAZEE
BY Davis, Hoxie & Faithfull
ATTORNEYS

UNITED STATES PATENT OFFICE 2,568,110

METHOD OF MAKING GLASSY PHOSPHATE DETERGENT COMPOSITIONS

Irving Beiley, Providence, R. I., and Arthur H. Razee, Mansfield, Mass., assignors, by mesne assignments, to Hulman & Company, Inc., Terre Haute, Ind., a corporation of Indiana Application October 28, 1946, Serial No. 706,114

1 Claim. (Cl. 252—135)

This invention deals with a process, and with a class of products, in which a glassy phosphate is intimately mixed with an hydratable salt and with water, and in which these constituents are so united or bonded physically that a product of improved physical constitution is obtained, whether in solid cake or granular form. The new product is useful, for example, as a water conditioner or as a detergent, or both.

Such a composite product is in demand in order to make both the phosphate and the salt available at the point of use without separately introducing them, in order to overcome certain objectionable properties or deficiencies of the phosphate and the salt when used alone, and in order to avoid the objectionable features of a simple dry mixture of the two. Proposals have been made for the mixing of such a phosphate, a salt and water with the object of forming an agglomerated particle and some use has been made of these procedures, but without fully satisfactory results. In general these have taken the direction of adding water to mixture of the phosphate and the salt, or of adding the phosphate to a damp mass made by admixture of the salt and water.

The object here is to improve upon known processes in the field by simplifying the mixing procedure and by affording a better control of its results, and to improve upon known products in respect of keeping qualities, solubility characteristics, and uniformity of distribution of the constituents.

The term "glassy phosphate" is used here to define that known class of phosphate substances which have the following characteristics:

1. They are vitreous (glassy) in character, being phosphate glass; and are glassy in appearance when seen by the naked eye as beads or flakes or sheets, and also when seen through the microscope as crushed particles. They are noncrystalline and do not form hydrates, but are soluble in water and are somewhat hygroscopic, taking up water of solution from humid atmospheres.

2. They are products of quickly chilling a molten mass containing a series of relatively heavy molecules representing molecular combinations of $Na_2O$ and $P_2O_5$, and their molecular constitution attained in the molten state is retained in the glassy physical state brought about by the quick chilling. While this molecular constitution attained at high temperature is metastable at ordinary temperatures, there is molecular rearrangement upon reheating yielding crystalline phosphates. (There are various ways of attaining this molecular constitution in the melt, and no limitation with respect thereto is to be implied from this description of the product.)

3. The analytical composition represented by the ratio of $Na_2O$ to $P_2O_5$ ranges from a ratio of 1 to 1 up to a ratio of 1.5 to 1 or higher, although it is difficult to produce a material that is completely glassy when the ratio is above 1.5 to 1. This ratio, as analytically determined, quite certainly represents the weighted average ratio for several molecular species present, and approximates that of the species which is the most frequently occurring and the formula of which is often given to the whole glassy phosphate in question.

4. These glassy phosphates are exemplified by the materials of commerce known as (a) sodium hexametaphosphate for which the molar ratio is approximately 1.1 to 1 and which is sometimes represented by the formula $(NaPO_3)_6$; (b) sodium septaphosphate, for which the molar ratio is approximately 1.33 to 1 and the usual formula is $Na_9P_7O_{22}$; and (c) sodium tetraphosphate for which the molar ratio is approximately 1.4 to 1 and the usual formula is $Na_6P_4O_{13}$. These molar ratios do not agree precisely with the ratios for the molecular compositions indicated by the single formulas commonly used, the difference being due to the presence of other species of sodium phosphate and in some degree also to the presence of a small residue of around 0.5% of water chemically combined as in sodium acid pyrophosphate. The corresponding compounds of other alkali metals are also known but are less commonly used.

5. These glassy phosphates have the property of sequestering ions of calcium, magnesium and other polyvalent metals, and of deflocculating or dispersing certain solids, e. g., clay, dirt. They are commonly used in very low concentrations where use is made of these properties. They have the undesirable property in simple solution of being hydrolyzed to orthophosphate, with corresponding loss of these useful properties.

The discovery underlying the present process is that a glassy phosphate can be united with an hydratable salt in free flowing, non-caking, indiscerptible particles of homogeneous character, which are readily soluble in water and which cause both ingredients to go into solution at a uniform rate, by mixing suitable proportions of the phosphate and the salt while the glassy phosphate is in a relatively concentrated solution and the hydratable salt is in a powdery or finely divided state. When so mixed, the salt is largely or wholly hydrated by water from the solution, and the solution is thereby concentrated to a highly viscous state.

Characteristics of the new form of composite product thus made are these. Its glassy phosphate content is wholly in solution, more concentrated than the initial solution and so highly viscous as to act as an amorphous solid. The salt is hydrated in large part or in whole, the part hydrated having dissolved in the solution and crystallized out, taking water from the solution. The glassy phosphate suffers substantially less hydrolysis in this product than it would in a solution of the concentration used in making the product, this phenomenon being due apparently to the fact that in the product the glassy phosphate solution is concentrated to a degree (otherwise attainable with great difficulty, if at all) at which hydrolysis is greatly retarded. To the extent that hydrolysis occurs, the resulting orthophosphate exists in crystalline form, having crystallized out of solution, and the phosphate not hydrolized remains as glassy phosphate in the highly concentrated solution already described. The fact that the glassy phosphate is introduced in solution form, and that most or all of the salt goes through a solution stage, has an important effect upon the physical character of the particle that is produced, especially with respect to the minuteness of its constituents and the intimacy with which they are mingled.

The initial glassy phosphate solution is more concentrated than those in which glassy phosphates have been commonly used as a water softener, sequestering agent, deflocculating agent or for other purposes. It should contain at least about 10% of the glassy phosphate and may contain as much as 70 to 75%. The preferred range is from 20% to 65%.

Solutions of glassy phosphate up to 65% can be prepared without difficulty by slowly adding finely ground glassy phosphate to a body of water which is being agitated. Solutions up to 75% strength can be prepared similarly but with greater difficulty, and they require greater care and a considerably longer time. In general, the additional effort is not warranted as no advantage is to be gained by use of concentrations above 65%. For many purposes, a concentration of around 50 to 55% is satisfactory; and solutions of that concentration can be prepared by suspending an open-work basket of glassy phosphate beads in the water while stirring or circulating the water at a slow rate. Methods of concentration by evaporation at elevated temperatures are to be avoided because hydrolysis of the phosphate occurs rapidly at such temperatures.

The solution should not be prepared more than a few hours before being used in the mixing step. When in solution the glassy phosphate hydrolyzes to form orthophosphate ultimately or, intermediately, to form mixtures of the latter with pyrophosphate. The orthophosphates do not have the property of sequestering ions of calcium, magnesium and the like and lack other desirable properties of the glassy phosphates, so hydrolysis should be minimized. Likewise, the solution should be kept cool, since increased temperature promotes hydrolysis. We prefer even to prepare the solution in a jacketed vessel so that the heat of solution may be removed by the use of cooling water.

There is ordinarily no preparatory step necessary for the hydratable salt that is to be mixed with the glassy phosphate solution, since the only requirement as to its physical state is that the salt be in powdery or finely divided form and it usually comes to hand in that form. It should not be hydrated to any considerable extent, but the small degree of hydration that is sometimes found to exist in commercial products supposedly anhydrous can be tolerated.

The mixing step is carried out in any of several familiar types of stirring mixer, of either the batch or the continuous variety, capable of agitating and intimately mixing powdery solids with a viscous liquid and capable of continued stirring of the resulting mass. The agitation need not be violent, but should be uniform over the whole mass in order to bring about uniform and intimate contact of the salt particles with the solution.

It is preferable to add the solution gradually to the finely divided salt over a period of several minutes while the salt is undergoing agitation. Where the solution is at or near the low end of the stated range of concentration, and therefore relatively less viscous, and where the proportion of salt to be mixed with it is relatively low, it is a feasible alternative to add the salt to the solution while the latter is being agitated.

The time of mixing is short in any case, that is, around fifteen or twenty minutes. It varies with the character of the associated salt and with the proportions of phosphate, salt and water. The end point is fixed in any case by observation of the condition of the mass. In the case of a mixture of relatively low water content, the mixing may be continued to the point where the mass consists entirely of discrete particles which in the practical sense are solid, thereby giving directly a granular product without unduly prolonged mixing. Fines and any particles larger than the desired size can be removed by screening, as known.

Where the total water content of the mix is relatively high, the agitation may be halted while the mass is still a slurry, but thoroughly mixed to a homogeneous state, and the slurry may be run out into shallow containers and allowed to set into a cake which then may be crushed or ground to form the discrete particles; or it may be used in cake form. Screening to size may be employed in this case also, where the cake is crushed or ground.

An advantage of this process, from the standpoint of operating conditions during mixing, is that the mass does not reach as high a temperature as is reached in former processes. For example, starting with a glassy phosphate solution and hydratable soda ash at room temperature, and adding the solution to the soda ash while the latter was being agitated, a maximum temperature of 35° C. was observed; whereas a temperature of 65° was observed when the same phosphate was added to a preliminary mix of soda ash and water, and 50° C. was observed when water was added to a preliminary dry mix of the same phosphate and soda ash. The lower temperature of the present process minimizes hydrolysis of the phosphate and therefore gives a better control of the product.

A general characteristic of products made by this process is that the glassy phosphate content of the particle is wholly in solution. Former processes left a considerable part of the phosphate as separate undissolved particles which, whether or not united with the salt in particles, brought about undesirable effects. First, a redistribution of the water tended to occur as the product aged because the phosphate drew water from the salt; and especially where the mixture was made as a dry mix of phosphate and hydrated salt, this resulted in caking. Second, when the mixture was used, for example, as a water conditioner or detergent, the undissolved phosphate particles dissolved more slowly than the other ingredients and became available to perform their office as a sequestering or dispersing agent only after the other ingredients had become effective, or even after some of the other ingredients had been consumed. With the present product, where the glassy phosphate is wholly in solution, the phosphate and the salt go into solution at the point of use at substantially the same rate and therefore become available concurrently and in proper proportions in the solution.

Further, in this product, the glassy phosphate is in a uniform state of dispersion with respect to the water in virtue of being wholly in solution. Several advantages result. The hygroscopicity or vapor pressure of the product is uniform through the mass and can be controlled by the proportions of phosphate, water and hydratable salt that are used; whereas in known products, this property is not so uniform and varies with the degree of mixing and resulting distribution of the water, and varies with time because of the slow penetration of water into solid phosphate particles. The product is more stable, has better keeping qualities and less tendency to cake; whereas in former products there was a slow redistribution of water and possible localized excess proportions which tend to promote caking. All constituents of the present product are much more uniformly distributed, more minutely divided and more intimately dispersed among one another; whereas former composite particles were agglomerates of rather coarse sub-particles. In short, this new product attains to the full the advantages sought in making a non-hygroscopic, non-caking, free-flowing, indiscerptible composite product.

This process, characterized by the use of a solution of the glassy phosphate as one element of the mix, is susceptible of use with a considerable variety of anhydrous salts as a step in making solid composite products which physically unite the phosphate and the salt in the product. The salt must be one which will take up water from the phosphate solution, leaving the phosphate concentrated to a degree such that for practical purposes it acts as a solid constituent in the product in the presence of the hydrated salt and any remaining anhydrous salt. Within this limit, the user has a considerable choice, and may use one or more such salts in the mix depending on the character of product desired. It would also be a use of our process pro tanto, although in our view a less effective use of it, if after mixing the solution with the salt a minor addition of dry phosphate should be made to the mix. Nor does the process exclude the addition of wetting agents or other special purpose ingredients, either to the initial solution or to the initial salt or to the mass undergoing agitation. In general, such additives are non-hydratable substances and do not effect the relationship among the glassy phosphate, the hydratable salt and the water.

A particular application of the solution process described above is in making products in which a glassy phosphate is united in a composite product with one or more of a group of four hydratable salts having good detergent properties. We thus make an improved form of household or industrial detergent having water conditioning and deflocculating properties. These hydratable salts include (a) sodium carbonate, $Na_2CO_3$; (b) sodium carbonate and sodium bicarbonate, $NaHCO_3$, in proportions to form the sesquicarbonate $Na_2CO_3 \cdot NaHCO_3 \cdot 2H_2O$ when hydrated; (c) disodium hydrogen phosphate $Na_2HPO_4$; and (d) sodium triphosphate, $Na_5P_3O_{10}$. Of these, the triphosphate has ion sequestering properties and is especially compatible with the glassy phosphates. Mixtures of these salts may also be used and are to be understood here as being included in the term "salt." In particular, we find it desirable to use a mixture of soda ash and sodium bicarbonate with more soda ash than needed to form the sesquicarbonate hydrate.

The range of compositions for these products is shown in the accompanying triangular chart which is to be read in the light of the following description of the significance of its various points and lines.

On this chart, each point represents the percentage composition of a three component mixture, viz., glassy phosphate, hydratable salt (anhydrous basis) and total water, including both water of hydration and water of solution. Percentages of the phosphate are read from the left-hand margin 10 to the opposite apex P; those of the salt from the right hand margin 11 to the apex S; and those of water from the base 12 to the apex W. Points along any of the margins represent mixtures of the two components; for example, the right hand margin 11 represents mixtures of glassy phosphate and water, ranging from 100% water (at apex W) to 100% phosphate (at apex P). In like fashion, the composition of the hydrates of the salts may be represented by points on the left-hand margin.

With reference to the process, the right-hand margin 11 represents the solution of glassy phosphate which is mixed with the hydratable salt. A line drawn from any point on this margin (representing a particular solution) to the opposite apex S therefore represents all of the mixtures which can be made of that solution with the anhydrous hydratable salt; and conversely, if the desired mixture is known, a line from apex S through the point representing that desired ternary mixture will cut the margin 11 at the point representing the solution that should be used for that mixture.

The area representing the various mixtures of glassy phosphate, soda ash and water for which this solution process is useful is substantially that bounded by lines A, B, C, and D, the significance and determinants of each of which will now be stated.

Lines A and D are drawn from the apex S to the points on margin 11 representing glassy phosphate solutions of 75% and 9% concentration respectively. Since these two values represent the practical limits of the initial solutions which are useful in the process, the area between these lines represents the whole possible range of compositions which can be made by mixture of the named salts with solutions lying between those values. Other limitations further define the useful part of this total area in the making of solid products.

The upper limit of about 75% glassy phosphate concentration in the initial solution, determining line A, is fixed by a consideration of feasibility and economy in preparing the solution, and therefore it is not an absolute limit but a practical one, leaving some leeway beyond 75% if one wishes to accept the difficulties of preparing and of working with such viscous solutions, those difficulties increasing rapidly with even slight increases in concentration in that region. This solution gives a ratio of 1 part of water to 3 parts of glassy phosphate. We prefer for reasons of greater ease in preparing and working with the solution, to use solutions not over about 65% in strength (water ratio of about 1 to 2); and therefore line A—I drawn from apex S to the 65% point on margin II represents substantially the preferred lower boundary of the area.

The lower limit of about 9% for the initial solution is fixed at the concentration needed in making the limiting solid product represented by point M, the determinants of which are described below. The boundary D is therefore fixed by a line from apex S through point M to the margin II, which it strikes at about the 9% point. Since neither of the considerations fixing point M is precise, as will be seen from what follows, the line D as drawn is likewise not an absolute limit, and the minimum concentration of the solution to be used may therefore vary from 9% as the determinants of point M vary. This gives a water to glassy phosphate ratio of about 10 to 1. We prefer to use initial solutions of 20% or higher, giving mixtures on or to the right of line D—I drawn from apex S to the 20% point on margin II, giving a preferred minimum water ratio of about 4 to 1.

A first limitation beyond that fixed by the range of initial solutions is imposed by the minimum content of glassy phosphate and of salt that it is feasible to incorporate in a composite product of the sort in question. The purpose being to obtain to some effective degree the particular properties contributed by each solid constituent, these minima are not critical in value and are subject to individual preference or need. We therefore fix the minimum for each of these constituents at about 5%; and on the chart this is represented by lines B and D—2 which are drawn at the lines of 5% salt and 5% glassy phosphate. The intersections of these lines with the solution lines A and D thus further define the area of useful compositions. We prefer to use substantially higher contents of both constituents, and of necessity we do not use both in their minimum quantities. In general, the glassy phosphate content is at least 10% and is preferably higher, but not exceeding about 45% for reasons given below; while the salt content is 20% or more, and preferably is the major constituent.

The principal factor which further limits the area of useful products is the water content, the chief consideration being that the product shall be a solid. The water in the product is distributed between water of hydration, which is removed from any liquefying effect because the hydrates are crystalline solids, and water of solution which can be a substantial proportion because of the very high viscosity of the more highly concentrated solutions of glassy phosphate. The final determinant of water content therefore is the effect of the water remaining in the solution of glassy phosphate after the hydrate forming capacity of the salt has been exhausted. If this remaining water of solution still gives a highly viscous solution, on the order of 70 to 80%, or if the phosphate solution is not the predominant constituent, the product will be a solid in the practical sense involved here. These considerations exclude any products having a high content of water, and lead to a higher limit in the case of soda ash, which has a higher capacity for taking up water of hydration, than in the case of the three other salts.

For the mixture containing soda ash as the only or the predominant salt component, the upper boundary of the area in question, represented by line C, is therefore fixed by a consideration of the solidity of the product in the practical sense of forming either cakes or small particles which are self-sustaining in shape, are not plastic or pasty, and have no material tendency to compress or to stick together. Compositions lying above line C are characterized by increasing loss of these properties of solidity as the water content increases, and range from the plastic or semi-solid to the slurry state. Hence line C marks in substance the final boundary of the area in which the process is useful in making solid products. There is however no sharp line between products which are desirable from this standpoint of solidity and those which are not, and some element of individual preference enters. The preferred boundary is close to a line connecting points M and N, that is, point M representing 50% of water and the minimum of 5% phosphate (45% salt) and point N representing 30% of water and the minimum of 5% salt (65% phosphate). The lower total water content necessary with the lower salt content reflects the fact that with such mixtures the product consists to a greater exent of the phosphate solution rather than of the crystalline solid salt. Also, with less salt there is less capacity for binding water in hydrate form where it does not have a liquefying effect. The total water must therefore be less to assure that the phosphate solution will be sufficiently concentrated and therefore sufficiently viscous to give, with the crystalline solids, a solid product.

Within the preferred limits for the concentration of the initial glassy phosphate solution (lines A—I and D—I), there is no side boundary B in as much as the 65% solution line (A—I) intersects the line C at point N—I, where the salt content exceeds the 5% minimum of line B. At the other side, line C is intersected at point M—I by the line D—I, the 20% solution line; so within the preferred range of initial solutions the upper boundary extends from M—I to N—I but is still defined by line C.

The minimum phosphate content, together with the considerations of solidity which fix line C, combine to determine point M which represents the maximum water content for a desirable solid product containing this low phosphate content; and this point M in turn fixes the minimum initial solution of about 9% as already described.

It will be noted that with the preferred minimum phosphate solution of 20% concentration, it is not possible to make mixtures with as low as 5% phosphate except in the region of the higher salt contents, 75% and above, as shown by the fact that line D—I (the 20% solution line) lies to the right of boundary D—2 in the region above the line of 75% salt. Hence, for the preferred range of initial solutions, the left-hand boundary is marked by line D—2 for a part of the area and by D—I for the rest.

The foregoing description of the area (range of mixtures bounded by lines A—B—C—D on the chart, and the preferable area further defined by lines A—1 and D—1 and D—2, covers the use of the process where soda ash is the hydratable salt to be mixed with the glassy phosphate. For the other salts, viz., (a) soda ash and sodium bicarbonate in proportions such as to form the sesquicarbonate when hydrated, (b) disodium hydrogen phosphate, and (c) sodium triphosphate, there is a narrower range of mixtures that is useful in making a solid cake or solid particle product. The reason for this difference is illustrated by the case of soda ash which forms a septa-hydrate having a relatively high capacity for binding water in the crystal. It therefore permits a higher total water content in the composite product without loss of solidity. A consideration of vapor pressure equilibria would indicate that while this septa-hydrate might be formed transiently, only the monohydrate would be formed ultimately. We find however that solid products can be made in the region of the septa-hydrate, a fact which we ascribe to a failure to attain equilibrium. Of the other three salts, the sesquicarbonate and the triphosphate form only lower hydrates. In the case of the disodium hydrogen phosphate, we find that solid products can be made only in the region of the di-hydrate. These three salts have a substantially lower capacity for taking water from the solution, and therefore their mixtures require a lower limit on the total water content. This limit again is not critical for any given salt and phosphate content, since there is no sharp line between the solid and the non-solid state. We find it desirable, from the standpoint of making a commercially acceptable solid product with these three salts, to limit the maximum water content to a range embracing a few points either side of 20% and generally not exceeding 25%. As among the sesquicarbonate, disodium hydrogen phosphate, and the triphosphate, the last permits use of a somewhat higher water content. Its hydrate, $Na_5P_3O_{10}\cdot 6H_2O$, has a water content of 22.6% on a weight basis as compared with 20.2% for the disodium hydrogen phosphate and 16% for the sesquicarbonate, and therefore it withdraws relatively more water from the solution. This limiting value of about 20% is not greatly different for different contents of salt and phosphate, within any limits of significance in relation to solidity, and we therefore represent it by the line E on the chart, drawn at the line of 20% water as an approximation to be taken in connection with the directly observable solidity of the product. This gives the area bounded by lines A, E and D—2 as substantially the range of compositions for these three salts. Within the preferred range of initial solutions the area is further narrowed, being represented substantially by lines A—1, E and D—2. We do not however exclude a water content somewhat higher than 20% where in virtue of its content of crystalline solid in relation to its content of viscous amorphous glassy phosphate, the product is a solid in the practical sense. Furthermore, mixture of these salts with soda ash permits the inclusion of still more water.

It is not necessary that the salt be entirely hydrated. The water tends to distribute itself in such a way as to establish a vapor pressure equilibrium between the hydrate and the glassy phosphate solution, but it is evident that equilibrium is not always attained. There may be some anhydrous salt in the product after considerable aging, especially with total water contents near the minimum values given, but this does not adversely affect either the solidity or the use properties of the product.

From the foregoing one can summarize the limits for use of the process in making solid products with the four named hydratable salts, as follows:

With the sodium sesquicarbonate, disodium hydrogen phosphate and sodium triphosphate, the total water content is such as to give a solid product and, as described, is at or below about 20%. Its lower limit is expressed in terms of the ratio of water to glassy phosphate, viz., the ratio of 1 to 3 for an initial solution of 75% concentration, and the ratio of about 1 to 2 for the preferred maximum concentration of 65% for the initial phosphate solution. The content of glassy phosphate ranges from about 5% to about 60%, this upper limit being represented by point F where lines A and E intersect; or for the preferable initial solutions, by the point F—1 (about 37% phosphate with the preferred water to phosphate ratio of 1 to 2) where lines A—1 and E intersect. The salt content ranges from about 5% to about 93% (point G); for the preferred initial solutions it is insubstantially different within any limits that determine the salt content as a practical matter. In practice, the upper limit will usually be less than 90%. Since the upper limit for both the salt and the phosphate content is determined by the range of water content (points G and F or F—1), the whole area or range of compositions for these three salts is more simply defined by the minimum salt and phosphate contents of about 5% and by the water content as already defined.

For soda ash, the range of mixtures for which the process is useful in making a solid product is wider. The water content at its lower limit is defined as before in terms of the ratio of water to glassy phosphate, that is, the ratio of 1 to 3 (line A) or preferably 1 to 2 (line A—1); and its upper limit (line C) varies from about 30% for the minimum salt content (point N) to about 50% for the minimum phosphate content (point M). For the preferable range of initial solutions, the upper limit varies from about 32% for the minimum salt content to about 47 to 48% for the minimum phosphate content. The glassy phosphate ranges from the same minimum of about 5% to a maximum of about 70% (or for the preferable initial solutions, about 65%) fixed by the minimum salt and water. The salt content ranges from about 5% to a maximum of about 90% or slightly more fixed by the minimum phosphate and water. Hence, again, the phosphate and salt contents are more simply defined by their minima and by the range of water content (already defined) which fixes their maxima.

It will be understood that these ranges apply strictly only where the mixture contains only the salt, the glassy phosphate and the water. If any other solid materials are added, they can be ignored in determining the proportions among these basic components, with the qualification that such additives, if solids, may increase the tolerance for water somewhat within the basic limitation of obtaining a solid product. If the added material contains water, as in the case of a liquid wetting agent, for example, its water content should be allowed for in determining the total water content when working at or near the upper limit of water content in the basic ternary mixture, since otherwise the product will not be acceptably solid.

It should be observed also that the foregoing definition is in terms of anhydrous salt. In practice, the hydratable salt used in making the mixture will be found at times to be already hydrated to some slight degree as it comes to hand in ordinary commercial supply. Any substantial degree of pre-hydration either requires an unduly low content of very concentrated glassy phosphate solution, or at worst has so little capacity for removing water from the solution as to leave a liquid or plastic mixture. The use of such a starting material is to be avoided. However, except when working at or near the boundary C, or in aiming to obtain a precise composition, a small degree of pre-hydration may be disregarded in selecting the initial phosphate solution since its effect is merely to shift the composition slightly within the permissible area. In such cases, where a small difference in total water content may be of consequence, any water initially present as water of hydration in the salt should be allowed for by using a phosphate solution giving a correspondingly lower water content within the stated range.

One further factor needing consideration is the effect of hydrolysis upon the product composition as initially made according to the foregoing, the hydrolysis here considered being that which occurs as the product ages. The effect of hydrolysis is to convert a part of the glassy phosphate into ortho-phosphate with some reduction in the total water content. At any particular stage of hydrolysis, there may also be some pyrophosphate as an intermediate product, but it needs no particular attention in relation to solidity. The ortho-phosphate exists in crystalline form in the product so from the standpoint of solidity it may either be ignored or may be considered as an addition to the crystalline solid component. The amount of water consumed in relation to the glassy phosphate consumed is not such as to have a material effect on the concentration and viscosity of the glassy phosphate solution in the product, so the solidity of the product is not materially changed by the change in water content. Considering all effects, the net effect is to enhance rather than to impair the solidity of the product, so from that standpoint hydrolysis is not objectionable.

The undesirable effect of hydrolysis is usually expressed in terms of the reduction in calcium sequestering value. Whatever method of determining that value is used, we find that the most significant expression of the hydrolysis effect is the ratio of the calcium sequestering value of the aged product in question to the similarly determined value of a freshly made simple mechanical mixture of the same relative quantities of the hydratable salt and the glassy phosphate. With products in which the glassy phosphate is incorporated for its sequestering action, the factor of hydrolysis is important and bears on the selection of the composition to be used in attaining the desired final product quality.

We find that, in general, increase in the content of glassy phosphate within the range described above in which the process is useful is accompanied by an increase of hydrolysis in the product. The increase appears to be somewhat less for products of lower total water content. With reference to the triangular chart, hydrolysis increases with initial mixtures approaching the boundary B and appears to be somewhat less near the boundary A or A—1 than it is near the boundary C. Thus a sample having a glassy phosphate content of 35%, with 35% of water, and 30% of soda ash (anhydrous basis) showed a relative calcium value of 55%, as expressed by the ratio described above; while one of 40% glassy phosphate, with 21% water and 39% sodium triphosphate, showed a relative calcium value of 68%. Both samples were in the region of very substantial hydrolysis, in marked contrast to the region around 20 to 25% glassy phosphate where the relative calcium value of aged products runs around 80% or higher. It is noteworthy however that the hydrolysis in all cases is less than that which would occur in the absence of the hydratable salt, that is, with the phosphate solution alone; and it is less than would occur with the same mixture prepared by methods which do not give the uniformity which characterizes the products of this new solution process.

From the product standpoint, the significance of hydrolysis is therefore chiefly to introduce a factor which, within the area in which the process is useful, puts a further practical limit on the initial phosphate content of the product. To avoid undue waste of glassy phosphate, its initial content should be held to a maximum of about 45%, represented by line K on the chart. We prefer to employ from about 15% to about 25% of glassy phosphate, with about 10% to 45% of water and about 35% to 75% of soda ash, the higher salt content being accompanied by a lower water content. In the case of the other three hydratable salts, the preferred glassy phosphate range of about 15% to 25% is used with water from about 10% to 25% and salt from about 50% to 75%.

These preferred products have all of the advantages already stated which result from the solution process and its characteristic of leaving the glassy phosphate component wholly in solution.

This product dissolves without forming the viscous difficultly miscible layer characteristic of glassy phosphates alone and dissolves much more quickly. The phosphate and the salt components go into solution uniformly, as there is no undissolved phosphate to delay the dissolution of the whole and let the salt become effective before the phosphate becomes effective. The particles are of uniform composition throughout the mass, and this uniformity is found to exist no matter how finely the particles are sub-divided; the mixture appears to be indiscerptible. The particle product is free flowing and does not cake under normal or even unusual atmospheric conditions. These products suffer only a relatively small hydrolysis loss and even after prolonged aging have effective water conditioning properties in addition to their detergent properties.

A particular detergent product which exemplifies this preferred group is one made with 35 parts by weight of a 57% solution of commercial sodium tetraphosphate having a mol ratio of 1.4 $Na_2O$ to 1 $P_2O_5$. This solution is added to a dry mixture of 45 parts of anhydrous sodium carbonate and 15 parts of anhydrous sodium bicarbonate while the mixture is being stirred. Five parts of a liquid wetting agent, containing 40% or 2 parts of water, is likewise added during the stirring. Stirring is continued for about 20 minutes, including the period of about 5 minutes in which the tetraphosphate solution is added. The mass is allowed to set to a friable cake which is crushed or ground to form a granular product, with screening to size if desired.

This product as initially made has 17 parts of water. This divides between water of solution and water of hydration, and forms two hydrates, sodium sesquicarbonate and the monohydrate of sodium carbonate. Assuming complete hydration of the salts, its initial composition, with its salt expressed in terms of hydrate, is $Na_2CO_3.H_2O$, 30.4%; $Na_2CO_3.NaHCO_3.2H_2O$, 40.4%; solid wetting agent, 3%; and tetraphosphate solution 26.2%, having a concentration of about 76%. Its total salt content, on a hydrate basis, is 70.8% which is equivalent, on the basis of water of hydration capacity, to slightly over 73% $Na_2CO_3.H_2O$, illustrating the fact that for purposes of charting, this mixed salt may be treated as substantially equivalent to the single salt soda ash alone. On an anhydrous basis, the mixed salt (soda ash and bicarbonate) is about 60% of the total, equivalent to about 62% of soda ash alone. On this basis, the initial composition of this product, with the salt expressed on the anhydrous basis and the solid wetting agent either omitted from the total or put with the salt, may be stated and charted with sufficient accuracy as having 20% of sodium tetraphosphate, 63% of salt and 17% of water.

This product, upon aging, suffers a loss of only about 10% in calcium value; and therefore remains highly effective as a water conditioner as well as a detergent.

In applying the foregoing definitions of the full ranges and of the preferred ranges to an aged product that has undergone hydrolysis and upon analysis shows some orthophosphate, it makes no material difference whether the orthophosphate is classed with the salt, expressed on an anhydrous basis, or whether the orthophosphate is excluded from consideration and the composition of the remaining glassy phosphate, salt and water is taken for comparison. The composition will not be identical on the two bases, but the difference will not be significant from the viewpoint of conformity to the area here defined. In general, the effect of hydrolysis on the composition of the basic ternary system is to shift its proportions so that the point representing it on the chart is displaced to the left, but is still within the substantial limits of the defined area. In some instances, this basis of expressing the effect may put the point above line E or line C as those lines are fixed for a solid product consisting of these three basic constituents alone, but the product will still be within the substantial limit because of being still a solid in virtue of the crystalline orthophosphate. When the orthophosphate is classed with the salt as a part of the crystalline solid constituent, the composition will differ chiefly in showing a higher content of salt and a lower content of glassy phosphate, with but little change in the water content, so the point representing it on the chart will be displaced to the left with little vertical displacement.

In like fashion, any content of pyrophosphate shown by analysis is most simply classed with the glassy phosphate content; although with no significant difference its content may be set aside and the composition of the remainder may be taken for comparison with the substance of the ranges as here defined.

We claim:

The process of making a detergent product comprising an indiscerptible mixture of uniformly dispersed glassy phosphate and detergent salt, which comprises bringing the glassy phosphate, while in water solution of about from 20% to 65% concentration, into intimate admixture with substantially hydratable, finely divided, sodium carbonate, the glassy phosphate content of the three component mixture being between about 5% and about 45%, the salt content being between about 20% and about 90% (anhydrous basis), and the water content being limited to give a solid product and not exceeding about 50%.

IRVING BEILEY.
ARTHUR H. RAZEE.

REFERENCES CITED

The following references are of record in the file of this patent:

UNITED STATES PATENTS

| Number | Name | Date |
|---|---|---|
| 1,604,126 | Kern | Oct. 26, 1926 |
| 1,979,926 | Zinn | Nov. 6, 1934 |
| 2,024,543 | Smith | Dec. 17, 1935 |
| 2,365,190 | Hatch | Dec. 19, 1944 |
| 2,382,165 | McMahon | Aug. 14, 1945 |
| 2,493,809 | Garrison | Jan. 10, 1950 |
| 2,494,828 | Munter | Jan. 17, 1950 |

FOREIGN PATENTS

| Number | Country | Date |
|---|---|---|
| 20,884 | Great Britain | 1901 |

OTHER REFERENCES

Schwartz and Munter: Ind. and Eng. Chem., Jan. 1942, vol. 34, No. 1, pages 32–39.